(12) United States Patent
Byrne

(10) Patent No.: US 11,004,143 B2
(45) Date of Patent: *May 11, 2021

(54) METHODS AND SYSTEMS FOR CONDUCTING ELECTRONIC COMMERCE

(71) Applicant: Overstock.com, Inc., Salt Lake City, UT (US)

(72) Inventor: Patrick M. Byrne, Park City, UT (US)

(73) Assignee: OVERSTOCK.COM, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,843

(22) Filed: Oct. 4, 2019

(65) Prior Publication Data

US 2020/0111154 A1    Apr. 9, 2020

Related U.S. Application Data

(63) Continuation of application No. 13/462,496, filed on May 2, 2012, now Pat. No. 10,438,278.

(60) Provisional application No. 61/521,587, filed on Aug. 9, 2011.

(51) Int. Cl.
*G06Q 30/00*    (2012.01)
*G06Q 30/06*    (2012.01)

(52) U.S. Cl.
CPC ............... *G06Q 30/0641* (2013.01)

(58) Field of Classification Search
None
See application file for complete search history.

(56) References Cited

U.S. PATENT DOCUMENTS

| 7,574,426 | B1 | 8/2009 | Ortega |
| 2003/0088457 | A1 | 5/2003 | Keil et al. |
| 2003/0101126 | A1 | 5/2003 | Cheung et al. |
| 2007/0250492 | A1 | 10/2007 | Angel et al. |
| 2008/0033788 | A1* | 2/2008 | Cereghini ............ G06Q 10/04 705/7.31 |
| 2008/0109324 | A1 | 5/2008 | Rosmarin et al. |
| 2010/0042467 | A1 | 2/2010 | Bundy et al. |
| 2010/0094683 | A1* | 4/2010 | Symons ............ G06Q 30/0222 705/7.29 |
| 2011/0078049 | A1 | 3/2011 | Rehman et al. |
| 2011/0153449 | A1 | 6/2011 | Hite |
| 2012/0078754 | A1 | 3/2012 | Wiseman et al. |

* cited by examiner

*Primary Examiner* — Mila Airapetian
(74) *Attorney, Agent, or Firm* — Dorsey & Whitney LLP

(57) ABSTRACT

Various methods and systems are provided for conducting e-commerce. In one example, a method of conducting an e-commerce transaction includes a method of operating an online retail website. The method includes providing access to a computer interface for suppliers and presenting information to the suppliers through the computer interface regarding activity of the supplier's stock keeping unit (SKU). The suppliers are then enabled to directly modify at least one parameter associated with a presentation of the supplier's SKU on the retail website by way of the interface. The modification of the parameter may include, for example, modification of the presentation of the SKU including, for example, changing the title, adding video or photograph, or adding some other information. The modification of the parameter may also include, for example, modifying the price or entering into a bilateral agreement with the operator of the retail web site.

20 Claims, 8 Drawing Sheets

METHODS AND SYSTEMS FOR CONDUCTING ELECTRONIC COMMERCE

CROSS-REFERENCE TO RELATED APPLICATIONS

This application is a Continuation of U.S. application Ser. No. 13/462,496 filed May 2, 2012, now U.S. Pat. No. 10,438,278, which claims the benefit of U.S. Provisional Patent Application No. 61/521,587 filed Aug. 9, 2011, both entitled METHODS AND SYSTEMS FOR CONDUCTING ONLINE SALES, the disclosures of which are incorporated by reference herein in their entireties.

TECHNICAL FIELD

The present invention relates to electronic commerce and, more particularly, to methods, systems and programs for conducting and managing retail sales in an environment such as the internet.

BACKGROUND

Commercial transactions conducted through electronic communication (e.g., via the World Wide Web (the Web or the internet)), commonly known as "e-commerce," have become a significant segment of the global economy. In a typical e-commerce transaction, a user may access the internet by way of a communications device (e.g., a desktop or laptop computer, a smart phone, tablet or other internet enabled device) and accesses a retailer's or service provider's e-commerce website via the internet. Once the desired e-commerce website is located, the user may search the website for the desired good or service, either by conducting a search of the website or by paging through the website content such as by using menus or links provided on the website. The user may then add the desired product or service to a virtual "shopping cart" through selection of a graphical "button" or a link associated with a graphical or textual description of the good or service. The virtual shopping cart retains a listing of the user's intended purchases and the customer can continue "shopping" by exploring the website further and visiting other product pages.

After the user indicates that all intended purchases have been added to the virtual shopping cart, the e-commerce website presents a form to the user for the user to fill enter personal and payment information (e.g., name, address and credit card information). Once the payment information is approved, the website presents confirmation to the user that the transaction has been completed and may provide additional information regarding a delivery schedule or methodology.

E-commerce has been a benefit to new companies as well as to traditional "brick and mortar" companies. Virtually all companies have invested in some form of online presence. In some instances, they have established their own system for conducting e-commerce. In other instances, companies have offered their goods or services through a third party e-commerce system. Many companies do both.

Various systems and approaches have been implemented in an effort to make e-commerce more user friendly and more inviting on the one hand, and more profitable and manageable on the other hand. Continual efforts are being made to improve the e-commerce experience including efforts to provide systems and methods that make the experience more effective and more profitable for those offering goods and services for sale.

SUMMARY OF THE DISCLOSURE

Various methods and systems are disclosed herein regarding e-commerce and conducting transactions. In accordance with one aspect of the invention, a method of conducting an e-commerce transaction is provided that includes a method of operating an online retail website. The method includes providing access to a computer interface for suppliers and presenting information to the suppliers through the computer interface regarding activity of the supplier's stock keeping unit (SKU). The suppliers are then enabled to directly modify at least one parameter associated with a presentation of the supplier's SKU on the retail website by way of the interface.

In accordance with another aspect of the present invention, a method is provided for operating an online retail website. The method comprises providing access to a computer interface for at least one supplier. Information is presented to the at least one supplier through the computer interface regarding activity of at least one stock keeping unit (SKU) offered by the at least one supplier on a retailer's website. The at least one supplier is enabled to directly modify at least one parameter associated with a presentation of the at least one SKU on the retailer's website.

In various embodiments, the act of presenting information regarding the at least one SKU may include providing information regarding the relative positioning of the at least one SKU among search results including a plurality of SKUs, presenting information regarding the number of times the at least one SKU has been included in results presented to a consumer after the consumer conducted a product search, presenting information regarding the at least one SKU further includes presenting information regarding the number of times additional information about the at least one SKU was sought after the at least one SKU was initially viewed by a consumer, or presenting information regarding sales data for the at least one SKU. The sales data may be relative to sales data for other, similar products offered on the retailer's website.

The act of enabling the at least one supplier to directly modify at least one parameter may include a variety of options such as, for example, modifying an offering price of the at least one SKU, modifying the description of the supplier's SKU, providing a bonus offer associated with the supplier's SKU, enabling the at least one supplier to enter into a bilateral agreement with the retailer, or uploading a picture or a video associated with the presentation of the at least one SKU on the retailer's website.

The method may include additional acts as well. For example, the method may further include presenting updated information relating to the activity of the at least one SKU following the modification of at least one parameter by the supplier. The method may include enabling the at least one supplier to enhance a ranking of the supplier's SKU in results of a search on the retailer's web site. It may additionally, or alternatively include enabling the at least one supplier to provide monetary consideration to the retailer or enabling the at least one supplier to enter the at least one SKU into a retailer's promotion.

The act of enabling the at least one supplier to directly modify at least one parameter associated with a presentation of the at least one SKU may include enabling the at least one supplier to modify a plurality of parameters associated with a plurality of SKUs. Additionally, the method may include enabling the at least one supplier to upload the plurality of modified parameters to the retailer's website in a single upload-action.

In one embodiment, the act of presenting information to the at least one supplier through the computer interface regarding activity of at least one SKU offered by the at least one supplier on a retailer's web site may include presenting information to a plurality of suppliers regarding at least one SKU offered by each of the plurality of suppliers. Presenting information to a plurality of suppliers may further comprise maintaining information about at least one SKU of a first supplier of the plurality private with respect to the remaining suppliers of the plurality.

In another embodiment, wherein presenting information to the at least one supplier through the computer interface regarding activity of at least one SKU offered by the at least one supplier on a retailer's web site may additionally include presenting information regarding in a first category relating to impressions, a second category relating to clicks, a third category relating to conversion and a fourth category relating to economics.

In accordance with another aspect of the present invention, another method of conducting electronic commerce is provided. The method includes providing a plurality of stock keeping units (SKUs) for offering on a website of a retailer. Information provided about the plurality of SKUs is accessed through an interface provided by the retailer. At least one parameter associated with the presentation of at least one of the plurality of SKUs on the retailer's website is then modified.

In accordance with yet another aspect of the present invention, a system is provided for suppliers to manage the offering of their stock keeping units (SKUs) on a retailer's website. The system includes a first computing system having data associated with the performance of a supplier's SKUs on the retailer's website, the first computing system being in communication with a network. A second computing system is also coupled with the network. The system further includes an interface accessible by the second computing system that enables the supplier to modify at least one parameter associated with the presentation of the supplier's SKUs on the retailer's website.

Any of the acts or steps of the various methods may be combined with other acts of steps, and various systems may be used to implement such methods without limitation and as described in further detail hereinbelow.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

In e-commerce, products offered by an online retailer are conventionally located by a customer by either browsing the retailer's website, or by conducting a search for a particular product on the retailer's website, although they may also be located through third party search services (e.g., Google®, Bing®, Yahoo®, etc.). In one example, a customer might search for a computer by entering a search term "laptop" into a search window on the retailer's website. This search may return numerous results that possibly match the customer's search query. Indeed it may return multiple "pages" of results, meaning that a specified number of results (e.g., 25 or 50) are listed on a first, initial page of search results, and a user will be required to click on a link to view one or more subsequent pages that contain additional listings. The order in which the results are presented to a consumer may be controlled to a certain degree. For example, the retailer may structure the order of results so that products with a higher margin of profitability are seen first. Other sort orders may also be used. Additionally, users may be able to sort the results according to certain criteria such as the most popular results first, the highest (or lowest) price first, or the results having the highest review scores first.

It has been determined that, when conducting e-commerce, most sales are derived from a very small number of results for a given search query. In other words a customer usually selects an item for purchase from a select number of results, often those that have been listed at or near the beginning of the list of search results, rather than reviewing the entire listing of results before selecting an item. Thus, online retailers, as well as suppliers of the goods being sold by the online retailer, have considerable interest in seeing that certain products obtain a prime position among search results.

The present invention includes various embodiments directed to systems and methods for conducting e-commerce including the implementation of processes that enable suppliers (sometimes referred to as "partners") and online retailers to more effectively market and sell products through an e-commerce system. The systems and methods may involve the use of a variety of communications devices and may be implemented using computing devices over a network, such as the internet, as will be described in additional detail below.

Figure 1:
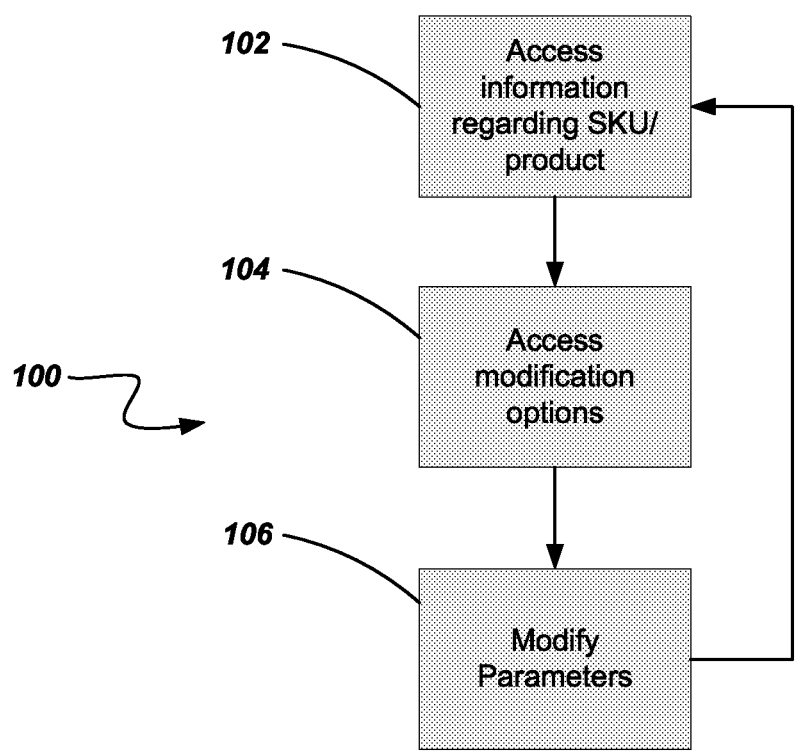
FIG. 1 is a flow diagram showing a method of conducting an e-commerce transaction in accordance with an embodiment of the present invention.
Figure 2:
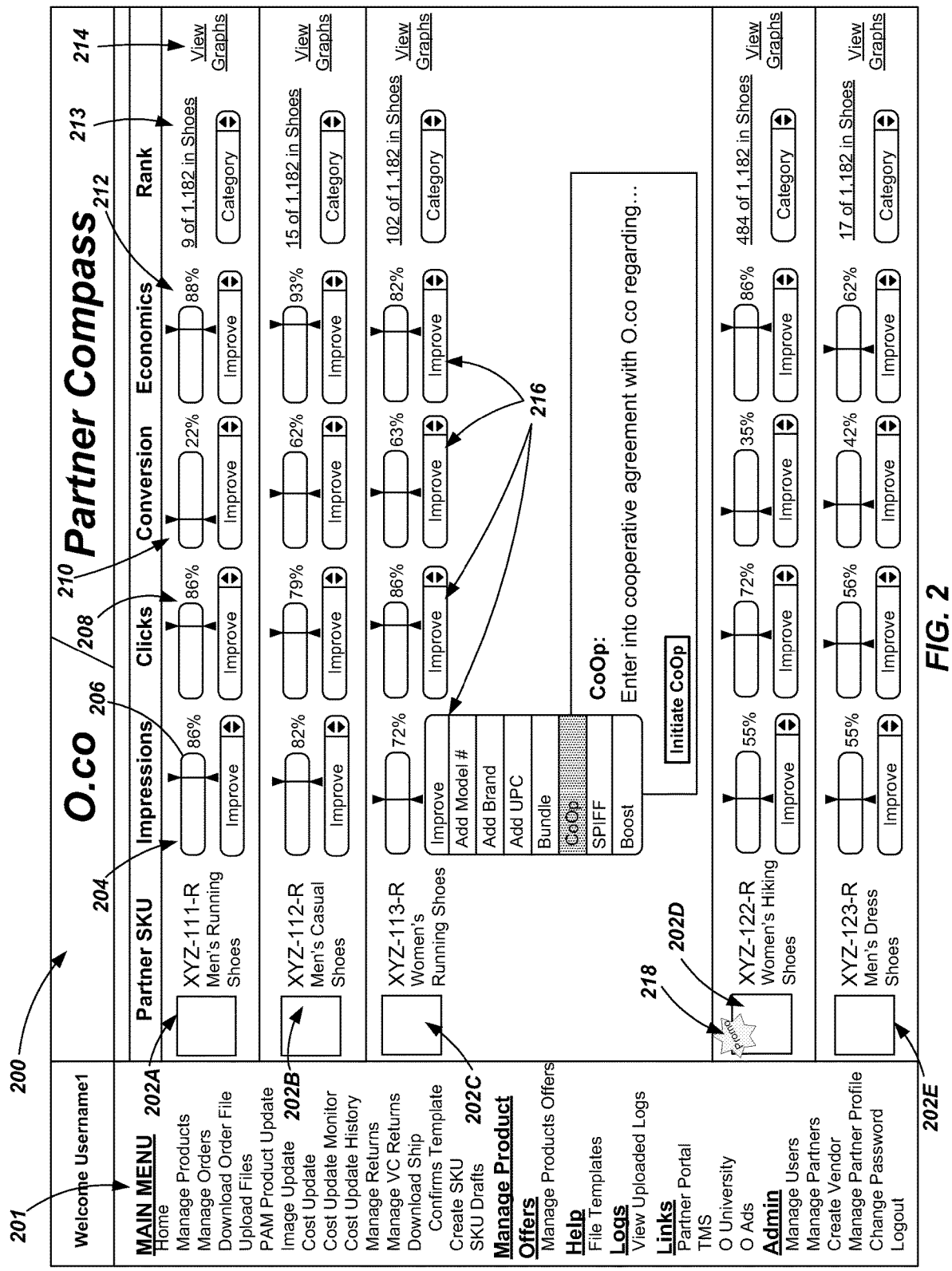
FIGS. 2-6 are example screen shots illustrating an interface including various aspects and features associated with the present invention.

Referring initially to FIG. 1, a flow chart depicts various acts that may be used in a process 100 in accordance with one embodiment of the present invention. In an initial act 102, a supplier accesses data, provided by the retailer, related to the offering of the supplier's product or stock keeping unit (SKU) through the retailer's website. This data may include information regarding the positioning of the product within search results given certain keyword searches that have been conducted. It may also include information regarding the number of page views for the product, the number of sales transacted during a given period of time, the economics associated with such sales as well as other relevant data.

After reviewing this data, the supplier may directly access one or more modification options associated with the presentation and offering of the product of SKU, as indicated at 104. Examples of such modifications are discussed in further detail below. If the supplier modifies certain parameters, as indicated at 106, they may then continue to monitor the product by reviewing updated data (i.e., return to act 102). This process may continue until the supplier is satisfied with the sales data associated with product (e.g., the number of sales and the profitability of the product). This entire process may be conducted online (e.g., by way of various types of communication or computing devices) without direct human interaction between the online retailer and the supplier. In other words, the supplier or partner does not need to contact the retailer to ask them to alter certain aspects or parameters associated with the offering of the product on the retailer's website.

Referring to FIGS. 2-6, example screen shots are shown illustrating a potential interface 200 that may be used by a supplier when incorporating the method shown and described with respect to FIG. 1. The interface includes a number of different menu options 201 as will be appreciated by those of ordinary skill in the art. The menu options 201 may be provided and configured, for example, to enable a user to navigate the program or site, access various features of the program or site, initiate actions (e.g., download or upload information) or access other programs or sites. The interface 200 additionally provides information regarding a number of individual products, or SKUs 202A-202E. Various data and information is provided in the interface 200 regarding each SKU 202A-202E. For example, as indicated at 204, information may be provided regarding the number of "impressions" or views the SKU is getting on the online retailer's website. This information may include, for example, the number of times a SKU 202 is included in search results. This information might also include specific data relating to search results for given keywords. For example, the rank of the SKU within search results for a given set of search parameters.

The information may be provided to the supplier in any of a number of forms. For example, the information may be provided as raw data, such as in a table or in a trending graph (see, e.g., FIG. 6). The data and information may also be presented as analytical data such as by comparing it to other SKUs in a common category of goods, or it may be provided in the form of an index or performance score 206. The index or performance score 206 may represent, for example, the performance of a given SKU 202 relative to other SKUs in a given category or it may provide a formulaic representation of the SKUs performance in the view of the retailer (i.e., according the analysis performed by the retailer). In one particular embodiment, the index or performance score 206 may be represented as a percentage of average performance for a defined category of goods. In other words, a score of 100% indicates that the SKU is performing at least as well as the average SKU within the defined category. A score of less than 100% would indicate that the SKU is performing sub optimally, or less than average, relative to other SKUs within the goods category for the specified parameter (e.g., Impressions).

It is noted that the interface 200 is shown in a general, simplified form and that further information may be obtained through the interface 200, such as by way of hyperlinks, drop-down menus, or other interactive features associated with, for example, the SKUs 202A-202E, the index 206 or the information or category headings (e.g., 204). It is also noted that the arrangement of the interface 200 shown in FIGS. 2-6 is merely an example and that other arrangements, including more or fewer categories of information, may be used. For example, while the particular examples shown in FIGS. 2-5 include SKUs 204 organized by rows and categories of information (e.g., Impressions 204) organized by columns, such could be reversed, or other desirable arrangements may be used.

As indicated at 208, information may be provided regarding whether or not customers are "clicking" on or selecting a given SKU 202 after having viewed it in a list of search results in order to obtain more information regarding the SKU 202. In other words, if a consumer saw the SKU in a list of search results (or in association with a promotion by the retailer, as a featured item on the retailer's website, or otherwise), if the consumer decided to visit the "product page" of the SKU, or otherwise obtain additional information about the SKU from the retailer's website, such would be considered a "Click."

Additional information may also be provided regarding "Conversion" as indicated at 210. This information may include data regarding how many people purchased a given SKU 202 after having viewed it and/or having "clicked" on it to obtain further product information. Another example of information that may be provided to the supplier includes formation regarding the Economics of the SKU as indicated at 212. This information may include, for example, the economic value provided to the online retailer when a sale of the SKU 202 occurs at given pricing conditions. It may additionally, or alternatively, contain information regarding the supplier's profit based on the sale price and the amount retained by the retailer. The rank of the SKU within a defined category or subcategory may also be provided, as indicated by reference numeral 213.

Of course the above-described categories of information are only examples and it is contemplated that additional and different information may be provided to the supplier. The various categories (e.g., 208, 210 and 212) may also each include individual indexes or performance scores (all generally shown as 206) as described above with respect to Impressions 204. Of course, other means of presenting performance data, including links to graphs 214 or other pages of information may also, or alternatively, be used such as already indicated with reference to FIG. 6.

A number of modification options 216 may be associated with one or more of the various categories of information (e.g., such as shown in association with Impressions 204, Clicks 208, Conversion 210 and Economics 212). In one embodiment, the modification options 216 may be associated with a drop down menu with the heading "Improve," although other means of presenting and effecting such options may be implemented. Potential modification options 216 associated with the category of information regarding impressions 204 include various options provided to the supplier to help them improve the number of impressions or views that the associated SKU receives when someone searches for a product—either on the retailer's website or through an internet search engine. For example, referring to FIG. 2, modification options 216 associated with the category of Impressions may include the ability to update the information provided by the supplier in association with the SKU. As indicated in the drop down menu shown in FIG. 2, the supplier may be able to add a model number, list a brand name or add a universal price code (UPC) to the description of the SKU. Such additional information may not only be effective in helping individuals find a specific product or brand within the retailer's system, but may also make it more likely that an internet search engine (e.g., Google, Bing, etc.) will locate the SKU within the retailer's system and place the SKU at a higher ranking within a set of search results.

Additionally, other options may be provided, such as an option to "Bundle" the particular SKU with another SKU (e.g., to bundle socks with shoes or to bundle casual shoes with running shoes) at price that is reduced compared to buying the two items separately. This may be used, for example, to tie a lower performing SKU with a higher performing SKU and get more views of the lower performing SKU by consumers.

Examples of other options that may be associated with improving the impressions of a particular SKU include the option to provide a "Spiff" or the opportunity to enter into a CoOp with the retailer. One example of a "Spiff" includes having the supplier or partner offer a bonus product (another SKU) with the purchase of the SKU under consideration. This may change the basic economics associated with the SKU being offered so as to make it more appealing to a customer. This may also make it more desirable for the retailer to place the SKU 202 in a more prominent search results position.

With regard to the option of a CoOp, one example includes the retailer offering to feature the SKU more prominently in their advertising and marketing in exchange for some other consideration from the supplier or partner. Such consideration may include, for example, providing the given SKU at a reduced cost to the consumer for a specified period of time without changing the amount of revenue that will be provided to the online retailer. Another example of a CoOp may include providing an opportunity, for appropriate consideration (e.g., payment of a premium, reducing the price of the SKU without effecting the economics of a sale of the SKU for the retailer, etc.), to feature the SKU on the retailer's website in some manner such as in association with an upcoming sale or promotion. It is noted that the user interface 200 may provide an indicator 218 regarding which SKUs are already participating in one or more promotions.

Yet another modification option may be referred to as a "Boost" which provides the supplier with an opportunity to pay a premium in exchange for ensuring that their SKU is ranked or positioned higher within set of search results for a period of time.

Figure 3:
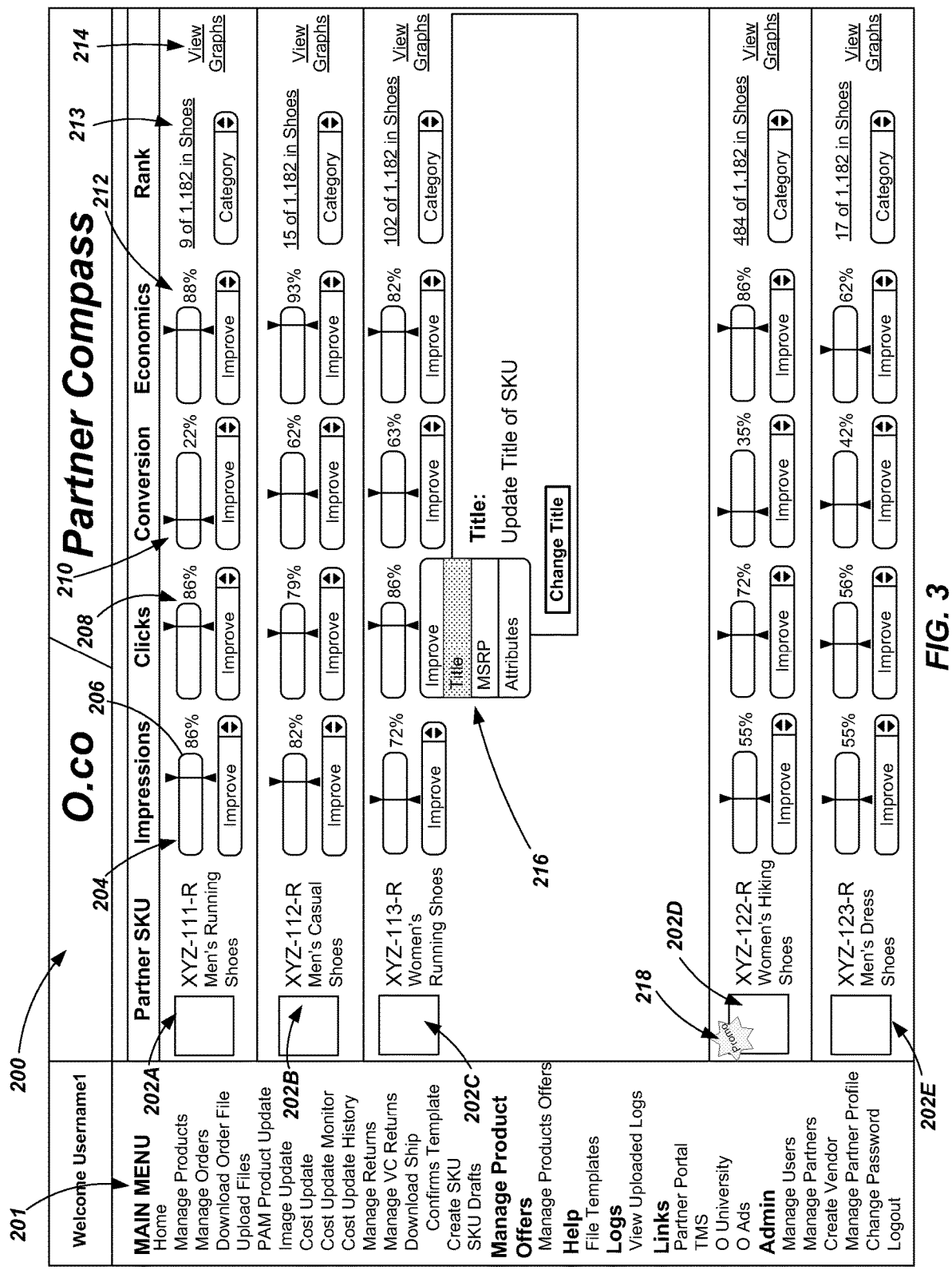

Considering the category of Clicks 208, and with reference to FIG. 3, examples of modification options 216 may include providing the ability of the supplier or partner to change the title associated with the SKU 202 so that certain keyword searches are more likely to "catch" the SKU 202 or to more properly match the product being offered with such a search. Another modification option may be offered to provide or to alter the manufacturer's suggested retail price (MSRP) for the SKU 202. Additionally, an option may be provided for the supplier or partner to include or modify various attributes associated with the SKU. For example, the type of material that the product is made from (e.g., leather, silk, stainless steel, aluminum), the size of the product, the color of the product and other such attributes that would indicate to the customer whether they had found a product that matched their desired criteria.

Figure 4:
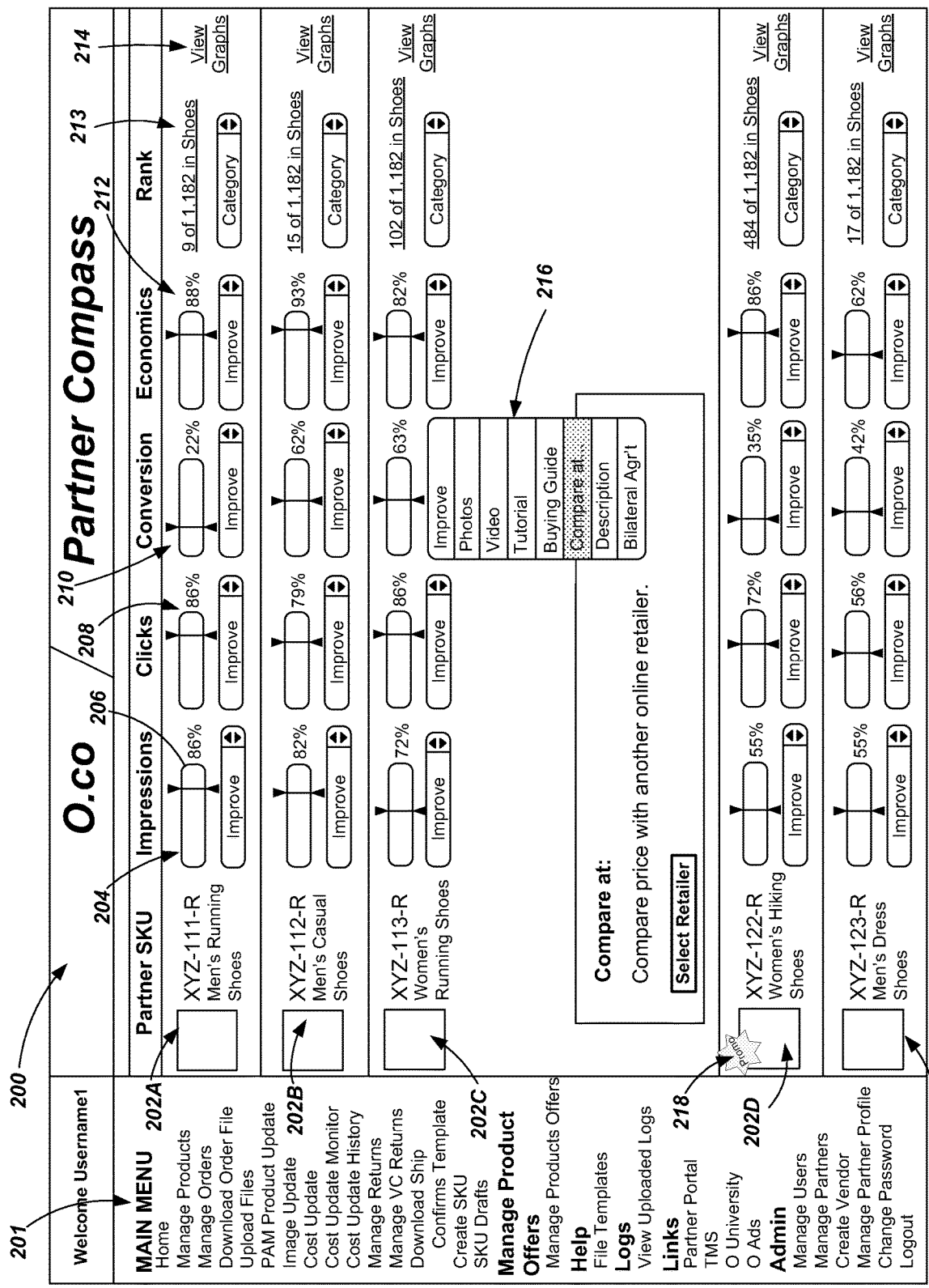

Looking at the category of Conversion 210, and with reference to FIG. 4, modification options 216 may include the ability for the partner to add or modify photos, videos or other aspects of the SKU's description that are presented on the retailer's website. Another example of a modification option 216 includes providing the ability to provide a price comparison from another online retailer. Such additional information may even include tutorial videos and buying guides to help a consumer learn about the product category and better understand the value of the particular SKU. These types of modification options will enable the partner to better market or sell the product when a consumer has "clicked" on a SKU to learn more about it in their efforts to make a purchasing decision. In another example, the supplier may be given the ability to set the price by option or attribute for a given SKU. Thus, for example, the price may be varied based on material, color, size or other attributes that may be selected by the consumer.

Additionally, a "bilateral" option may be provided wherein the retailer sets forth an offer to modify a parameter associated with the SKU 202 so long as the supplier also agrees to another stated modification. For example the retailer may offer to account for a discount of 5% on the sale price if the supplier likewise offers a discount of 5% on sale price. This bilateral agreement would then result in a discount of 10% to the customer (making it more enticing to purchase in comparison to other related products offered on the retailer's website) with each of the retailer and the supplier taking responsibility for the stated portion of that discount. Of course, the discount may also be split in non-even ratios as well. Another way of structuring a bilateral option may be to provide a specific price reduction recommendation to the supplier or partner (for example, based on proprietary data available to the retailer for related goods) with the understanding that the entire amount of reduction will be passed on to the end customer. Again, in such an agreement, responsibility for the discounted amount could be split between the retailer and the supplier at a defined ratio, or it could be carried entirely by the supplier— with the retailer's consideration being, for example, the proprietary analysis about a suggested price change based on their data.

Figure 5:
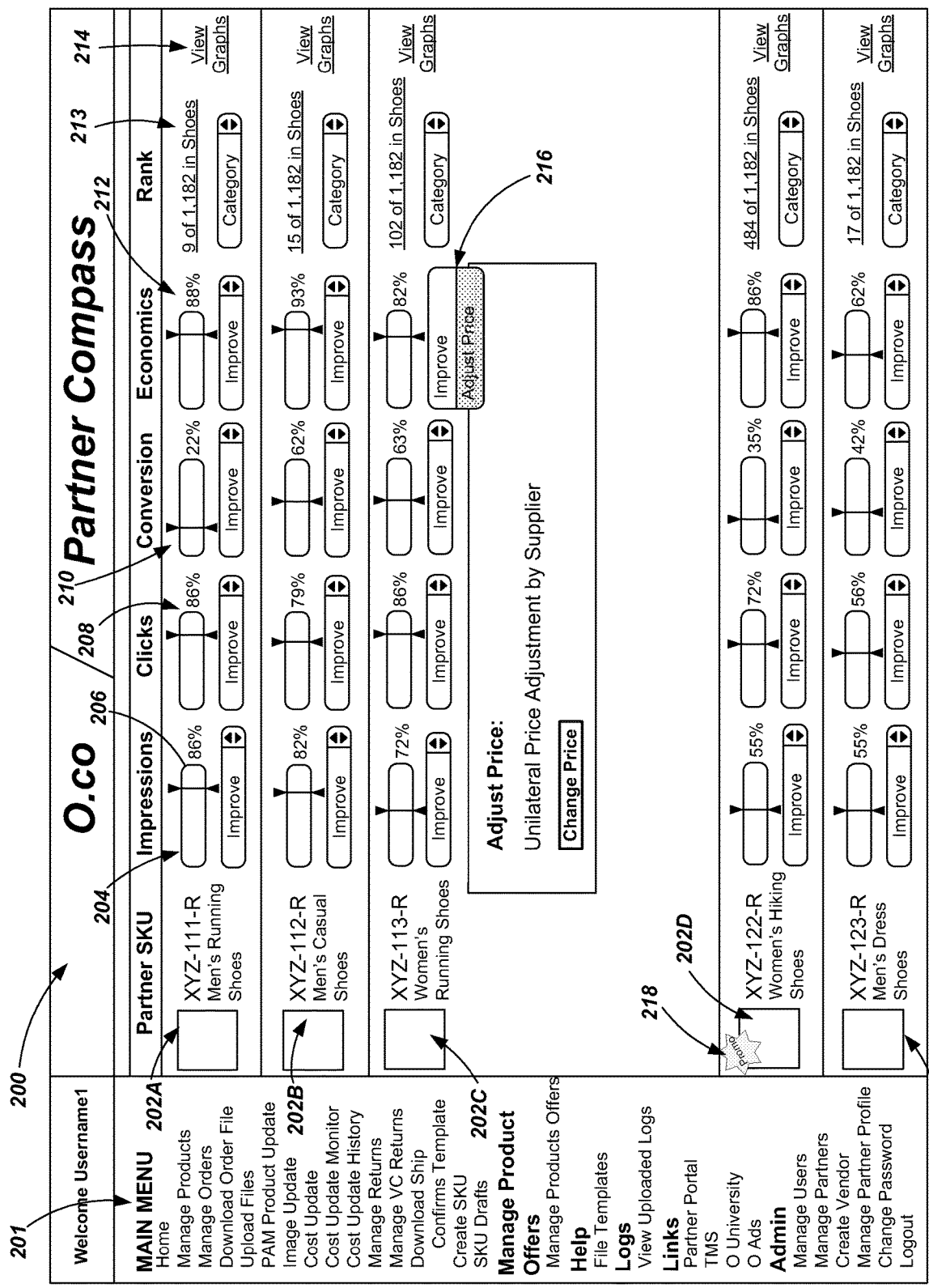
Figure 6:
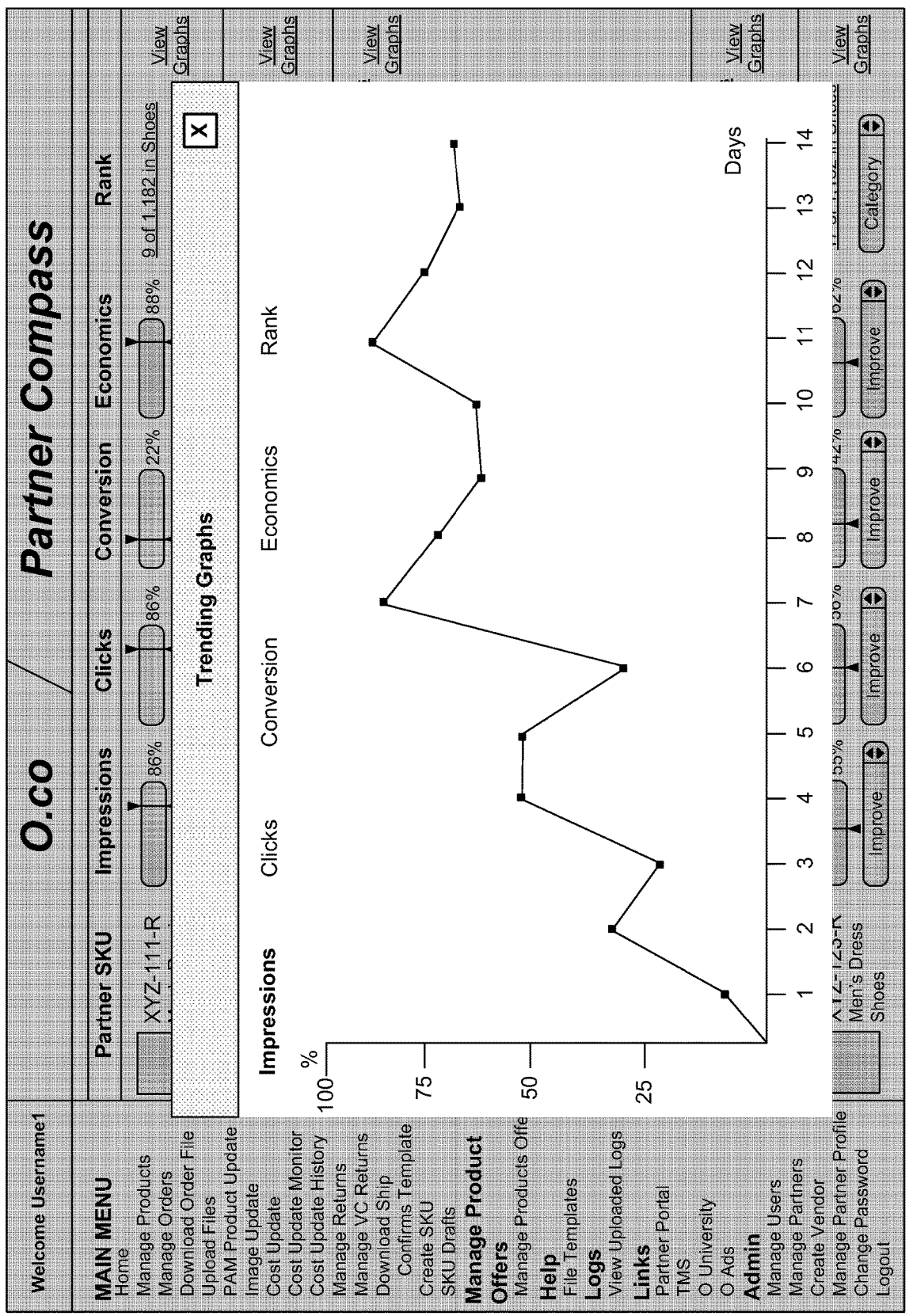

Considering now, with reference to FIG. 5, the information category regarding Economics 210, modification options 216 may include the ability of the supplier to unilaterally alter the price of the SKU 202 with the understanding that the change in price will not impact the profit received by the online retailer based on the sale of the SKU 202 at the altered price.

Various other modification options may be provided to the supplier and the above examples are not limiting. The modification options provided by the retailer will enable a supplier to effectively alter the offering of their SKU 202 on the retailer's website. These modifications may have an impact not only with regard to the appeal of the SKU 2022 a customer, but also with respect to the position of the SKU 202 within search results when a customer conducts a search for a product on the retailer's website as well as the economics associated with the offering. Thus, the supplier may have greater control over their product offering and become a more integrated partner with the retailer by enhancing the appeal and the economic value of a given SKU 202. Additionally, while various examples of modification options have been provided for the different categories of information, it is noted that some of the example options may be used in different categories than described above, some options may be available in association with multiple categories of information, and other modification options not specifically described herein may be used without limitation.

As previously noted, after making modifications to one or more parameters associated with the offering and presentation of a particular SKU 202, the supplier may return to the interface 200 to monitor the SKU 202 and determine whether there has been any change in its performance by reviewing the various categories of information 204, 208, 210 and 212. The supplier may continue to do this as indicated previously with regard to FIG. 1, until they are satisfied with the sales performance of the SKU 202.

The methods described herein may be extended to multiple suppliers simultaneously so as to engender competition among multiple suppliers with regard to the placement of their SKUs in more prominent search result positions and in an effort to increase the sales of their SKUs relative to other products in a given category. The method may be implemented by providing a website that is accessible by suppliers and having an interface, such as described above, giving the ability to the suppliers to more directly control certain parameters associated with the presentation and offering of their products on the retailer's website. In one embodiment, each supplier may only see and have access to information regarding their own SKUs. In other embodiments, some information may be provided by the retailer to a supplier regarding other supplier's SKUs such as in a generic or non-specific manner.

Various other options and features may be provided in the user interface 200. For example, sort features may be provided to the supplier in an effort to help the supplier organize and access the data and information in a simple and effective manner. In one embodiment, the SKUs (e.g., 202A-202E) may be presented in an order where the first listed SKU is one where the least amount of change (in terms of altering one or more modification options 216) will enable the biggest change in performance or the biggest jump in its placement in a listing of search results. Other orders of listing may also be used. Sort features may enable the supplier to list the SKUs by number, alphabetically by name or description, by goods categories (e.g., shoes or books), by rank within a defined category of goods, by performance in any of the categories listed on the interface (e.g., Impressions, Clicks, etc.), or by any other appropriate manner.

Another feature that may be included is the ability to make numerous changes to multiple SKUs (e.g., changing various modification options) and then uploading all of the changes at one time to the retailer's website at one time. Similarly, if the supplier wished to work "off-line," the supplier could export all of the information associated with their SKUs to their own computing device, make changes and then upload all of the changes back to the retailer's system.

The user interface 200 may also include information such as the quantity of stock on hand for a given SKU, as well as a forecast regarding how many days until the stock will be depleted based on information available to the retailer. Other information may include details regarding upcoming promotions or holiday events that may be available to the retailer. Additionally, links to information provided by consumers about the supplier's SKUs may be provided. Such information may include, for example, product reviews, questions asked by consumers, customer surveys, or information relating to the return of various products to the retailer/supplier by customers.

Figure 7:
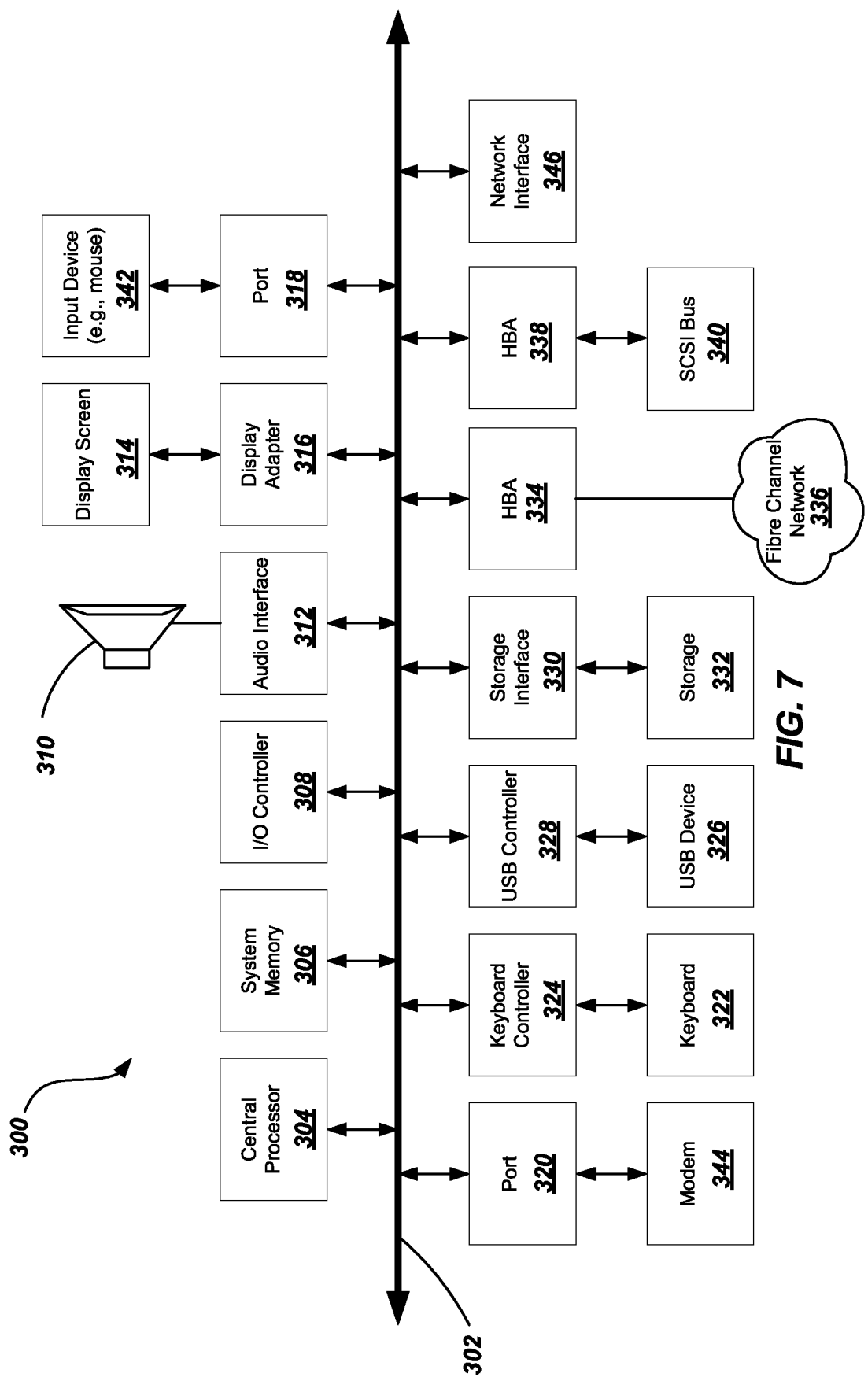
FIG. 7 is a diagram showing a computing system that may be used in accordance with one example embodiment of the present invention.
Figure 8:
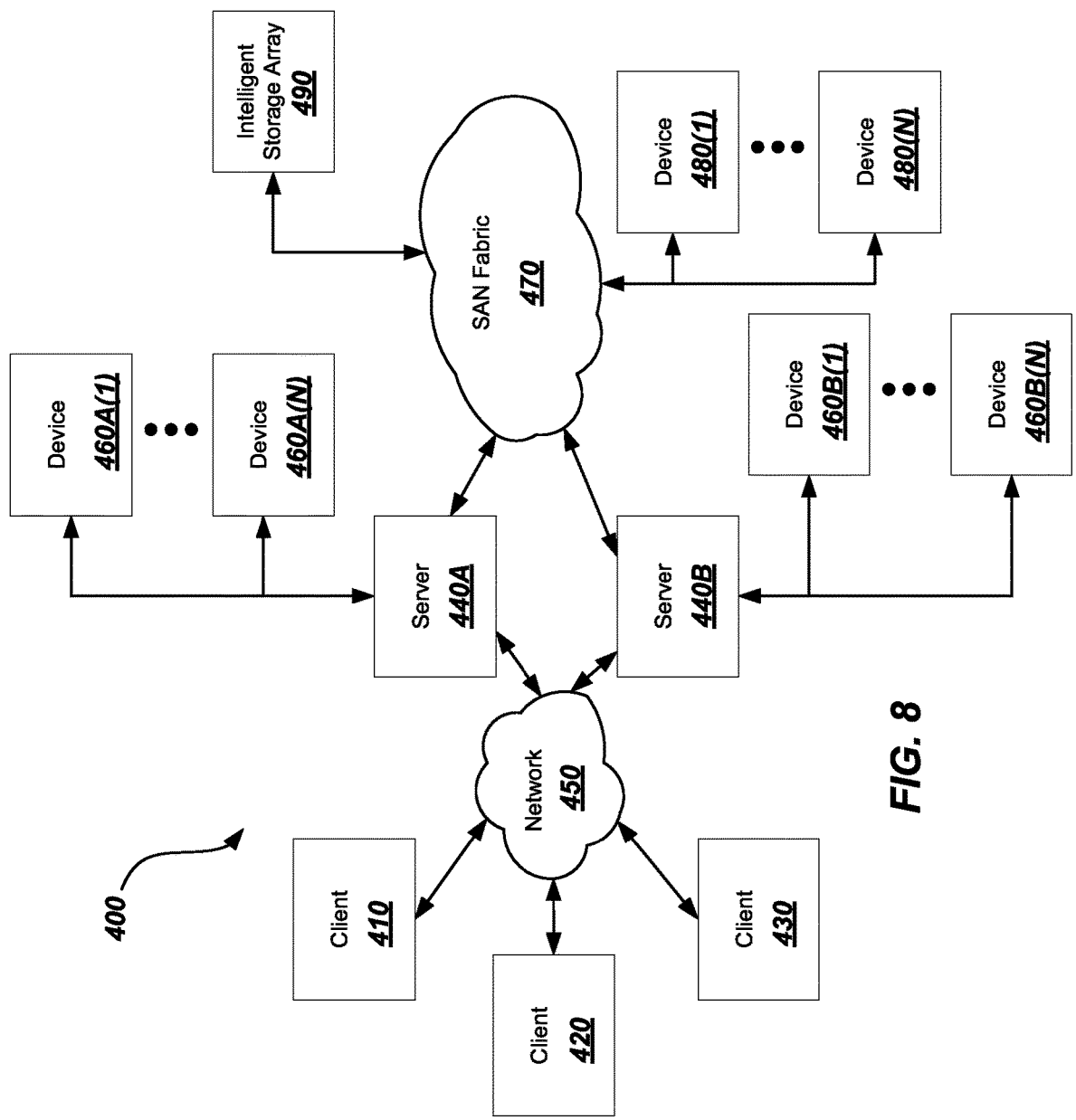
FIG. 8 is a diagram showing a network structure that may be used in accordance with one example embodiment of the present invention.

Referring now to FIGS. 7 and 8, diagrams are shown of examples of computing systems that may be utilized in implementing a method or process that may utilize the user interface described above. FIG. 7 depicts a block diagram of one example of a computer system 300 suitable for implementing the present systems and methods. Computer system 300 includes a bus 302 which interconnects major subsystems of computer system 300, such as a central processor 304, a system memory 306 (typically RAM, but which may also include ROM, flash RAM, or the like), an input/output controller 308, an external audio device, such as a speaker system 310 via an audio output interface 312, an external device, such as a display screen 314 via display adapter 316, serial ports 318 and 320, a keyboard 322 (interfaced with a keyboard controller 324), multiple USB devices 326 (interfaced with a USB controller 328), a storage interface 330, a storage device 332 (which may include a fixed disc, a floppy disc, an optical disc or other storage devices), a host bus adapter (HBA) interface card 334 operative to connect with a Fibre Channel network 336 and a host bus adapter (HBA) interface card 338 operative to connect to a SCSI bus 340. Also included are a user input devices 342 (e.g., a mouse or other point-and-click device—although such devices may also be coupled to the bus 302 via a USB controller 328), a modem 344 (coupled to bus 302 via port 320), and a network interface 346 (coupled directly to bus 302).

Bus 302 allows data communication between central processor 304 and system memory 306, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. Applications resident with computer system 300 are generally stored on and accessed via a computer readable medium, such as a hard disc drive, an optical drive, a floppy disk drive, a flash memory drive or other storage medium. Additionally, applications can be in the form of electronic signals modulated in accordance with the application and data communication technology when accessed via network modem 344 or network interface 346.

Storage interface 330, as with the other storage interfaces of computer system 300, can connect to a standard computer readable medium for storage and/or retrieval of information, such as a fixed disc drive. A fixed disk drive or other storage device may be a part of computer system 300 or may be separate and accessed through other interface systems. Modem 344 may provide a direct connection to a remote server via a telephone link or to the Internet via an internet service provider (ISP). Network interface 346 may provide a direct connection to a remote server via a direct network link to the Internet via a POP (point of presence). Network interface 346 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable medium such as one or more of system memory 306, a fixed disc, an optical disk, a floppy disc, a flash memory drive or some other storage device. The operating system provided on computer system 300 may be, for example, MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

FIG. 8 is a block diagram depicting a network architecture 400 in which client systems 410, 420 and 430, as well as storage servers 440A and 440B (any of which can be implemented using a computer system such as shown in FIG. 7, for example), are coupled to a network 450. In one embodiment, a supplier program for managing SKU offerings on a third party retailer's web site may be located within a server 440A, 440B to implement the present systems and methods. The storage server 440A is further depicted as having storage devices 460A(1)-(N) directly attached, and storage server 440B is depicted with storage devices 460B (1)-(N) directly attached. SAN (storage area network) fabric 470 supports access to storage devices 480(1)-(N) by storage servers 440A and 440B, and so by client systems 410, 420, and 430 via network 450. An intelligent storage array 490 is also shown as an example of a specific storage device accessible via SAN fabric 470.

With reference to computer system 300 in FIG. 7, for example, a modem 344, a network interface 346 or some other method can be used to provide connectivity from each of client computer systems 410, 420, and 430 to network 450. Client systems 410, 420, and 430 are able to access information on storage server 440A or 440B using, for example, a web browser or other client software (not shown). Such a client allows client systems 410, 420, and 430 to access data hosted by storage server 440A or 440B or one of storage devices 460A(1)-(N), 460B(1)-(N), 480(1)-(N) or intelligent storage array 490. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of acts described and/or illustrated herein are given by way of example only and can be varied as desired. For example, while the acts illustrated and/or described herein may be shown or discussed in a particular order, these acts do not necessarily need to be performed in the order illustrated or discussed. The various exemplary methods described and/or illustrated herein may also omit one or more of the acts described or illustrated herein or include additional acts in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. It is additionally noted that the interface may be implemented in various forms including, for example, as a program implemented from a supplier's computing system that accesses data on the retailer's computing system or network; via the internet through a web browser; or through a retailer's server or network by way of a virtual private network that has been accessed by a supplier.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of operating an online retail website, the method comprising:
   presenting, by a processor of a first computing device via a computer interface provided therefrom, information to at least one supplier regarding activity of at least one stock keeping unit (SKU) offered for sale by the at least one supplier on a retailer's website including accessing data that is associated with a second computing device;
   collecting, by the processor, sales data on the at least one SKU;
   collecting, by the processor, sales data on a plurality of products offered on the retailer's website identified as being similar to the at least one SKU;
   presenting, by the processor, the sales data for the at least one SKU relative to the sales data for the plurality of products identified as being similar to the at least one SKU;
   identifying, by the processor, a first SKU of a relatively low performing product and a second SKU of a relatively high performing product based at least in part on analysis of the sales data, wherein at least one SKU is the first SKU and the second SKU is associated with one of the plurality of products identified as being similar to the at least one SKU;
   modifying, by the processor, at least one parameter associated with a presentation of the relatively low performing product associated with the first SKU on the retailer's website via the at least one supplier directly interfacing with the computer interface to alter the at least one parameter of the first SKU relative to the at least one parameter of the second SKU.

2. The method of claim 1, wherein presenting information regarding activity of the at least one SKU includes providing information regarding the relative positioning of the at least one SKU among search results including a plurality of SKUs.

3. The method of claim 1, wherein presenting information regarding activity of the at least one SKU includes presenting information regarding a number of times the at least one SKU has been included in results presented to a consumer after the consumer conducted a product search.

4. The method of claim 3, wherein presenting information regarding activity of the at least one SKU further includes presenting information regarding a number of times additional information about the at least one SKU was sought after the at least one SKU was initially viewed by a consumer.

5. The method of claim 1, wherein presenting information regarding activity of the at least one SKU includes presenting information including one or more of a first category relating to impressions, a second category relating to clicks, a third category relating to conversion, or a fourth category relating to economics.

6. The method of claim 1, wherein modifying at least one parameter includes modifying an offering price of the at least one SKU.

7. The method of claim 1, wherein modifying at least one parameter includes modifying a description of the first SKU.

8. The method of claim 1, wherein modifying at least one parameter includes providing a bonus offer associated with the first SKU.

9. The method of claim 1, further comprising presenting updated information relating to the activity of the at least one SKU following modification of at least one parameter by the supplier.

10. The method of claim 1, further comprising enabling the at least one supplier to enhance a ranking of the first SKU in results of a search on the retailer's website.

11. The method of claim 1, further comprising presenting, by the processor, the first SKU, including the at least one modified parameter, via the retailer's website to consumer computing devices in communication with the retailer's website.

12. A system for suppliers to manage the offering of their stock keeping units (SKUs) on a retailer's website, the system comprising:
a first computing system having data associated with performance of at least one SKU belonging to a supplier on the retailer's website and being in communication with a network, the first computing system being configured to:
collect sales data on the at least one SKU;
collect sales data on a plurality of products offered on the retailer's website identified as being similar to the at least one SKU;
present the sales data for the at least one SKU relative to the sales data for the plurality of products identified as being similar to the at least one SKU;
identify a first SKU of a relatively low performing product and a second SKU of a relatively high performing product based at least in part on analysis of the sales data, wherein at least one SKU is the first SKU and the second SKU is associated with one of the plurality of products identified as being similar to the at least one SKU; and
modify at least one parameter associated with a presentation of the relatively low performing product associated with the first SKU on the retailer's website via the supplier directly interfacing with the first computing system via a computer interface to alter the at least one parameter of the first SKU relative to the at least one parameter of the second SKU;
a second computing system coupled with the network; and
an interface accessible by the second computing system that enables the supplier to initiate the modifying effective to alter how the first computing system presents the first SKU on the retailer's website to consumer computing systems with the network.

13. The system of claim 12, wherein the first computing system is configured to present the sales data for the at least one SKU by one or more of presenting information regarding a relative positioning of the at least one SKU among search results including a plurality of SKUs;
presenting information regarding a number of times the at least one SKU has been included in results presented to a consumer after the consumer conducted a product search;
or presenting information including one or more of a first category relating to impressions, a second category relating to clicks, a third category relating to conversion, or a fourth category relating to economics.

14. The system of claim 12, wherein the at least one parameter includes one or more of an offering price of the at least one SKU or a description of the first SKU.

15. The system of claim 12, wherein the first computing system is configured to modify at least one parameter by providing a bonus offer associated with the first SKU.

16. The system of claim 12, wherein the first computing system is further configured to enable the supplier to enhance a ranking of the first SKU in results of a search on the retailer's website.

17. A method of operating an online retail website, the method comprising:
presenting, by a processor of a first computing device via a computer interface provided therefrom, information to at least one supplier regarding activity of at least one stock keeping unit (SKU) offered for sale by the at least one supplier on a retailer's website including accessing data that is associated with a second computing device;
collecting, by the processor, sales data on the at least one SKU;
collecting, by the processor, sales data on a plurality of products offered on the retailer's website identified as being similar to the at least one SKU;
presenting, by the processor, the sales data for the at least one SKU relative to the sales data for the plurality of products identified as being similar to the at least one SKU;
identifying, by the processor, a first SKU of a relatively low performing product and a second SKU of a relatively high performing product based at least in part on analysis of the sales data, wherein at least one SKU is the first SKU and the second SKU is associated with one of the plurality of products identified as being similar to the at least one SKU;
modifying, by the processor, at least one parameter associated with a presentation of the relatively low performing product associated with the first SKU on the retailer's website via the at least one supplier directly interfacing with the computer interface to alter the at least one parameter of the first SKU relative to the at least one parameter of the second SKU;
enabling, by the processor, the at least one supplier to enhance a ranking of the first SKU in results of a search on the retailer's website; and
presenting, by the processor, the first SKU, including the at least one modified parameter, via the retailer's website to consumer computing devices in communication with the retailer's website.

18. The method of claim 17, wherein presenting information regarding activity of the at least one SKU includes one or more of presenting information regarding a relative positioning of the at least one SKU among search results including a plurality of SKUs;
  presenting information regarding a number of times the at least one SKU has been included in results presented to a consumer after the consumer conducted a product search;
  or presenting information including one or more of a first category relating to impressions, a second category relating to clicks, a third category relating to conversion, or a fourth category relating to economics.

19. The method of claim 17, wherein modifying at least one parameter includes one or more of modifying an offering price of the at least one SKU, modifying a description of the first SKU, or providing a bonus offer associated with the first SKU.

20. The method of claim 17, further comprising presenting updated information relating to the activity of the at least one SKU following modification of at least one parameter by the at least one supplier.

\* \* \* \* \*